United States Patent [19]

Shipp et al.

[11] 4,016,900
[45] Apr. 12, 1977

[54] SPRINGLESS VALVE FOR PNEUMATIC TIRES AND THE LIKE

[75] Inventors: John William Shipp, Centerville; Paul Douglas Goodman, Dickson, both of Tenn.

[73] Assignee: Scovill Manufacturing Company, Waterbury, Conn.

[22] Filed: Apr. 21, 1975

[21] Appl. No.: 569,777

[52] U.S. Cl. .................. 137/223; 137/231; 137/234.5; 137/533.25; 137/533.31
[51] Int. Cl.² ........................................ F16K 15/20
[58] Field of Search ....... 137/223, 231, 230, 234.5, 137/542, 543.21, 533.31, 533.25; 251/149.1, 149.7; 152/427, 429

[56] References Cited

UNITED STATES PATENTS

| 1,297,326 | 11/1917 | Porter | 137/223 |
| 2,131,740 | 10/1938 | Kappelman | 251/149.7 |
| 2,309,430 | 1/1943 | Albert | 137/223 |
| 2,588,493 | 3/1952 | DeStefano | 137/223 |
| 2,854,018 | 9/1958 | Kilmarx | 137/612.1 X |

FOREIGN PATENTS OR APPLICATIONS

| 1,140,742 | 1/1969 | United Kingdom | 137/533.25 |

Primary Examiner—Harold W. Weakley
Attorney, Agent, or Firm—Dallett Hoopes

[57] ABSTRACT

Valve member is supported by clips which slide along fitting as valve is opened or closed by air pressure. Radial openings in wall of fitting may be exposed for discharge by backing fitting off stem. Especially adapted for fast filling and discharge of air from large tires and the like.

10 Claims, 8 Drawing Figures

SPRINGLESS VALVE FOR PNEUMATIC TIRES AND THE LIKE

BACKGROUND OF THE INVENTION

1. Field of the Invention

This invention relates to valves for pneumatic tires and the like. More specifically, it relates to valves usable with off-highway vehicles such as large earth-moving equipment and mining and agricultural equipment. It has special application to large diameter high pressure tires equipped with fast filling and discharging fittings commonly called "super bore" connections.

2. Description of the Prior Art

The prior art abounds with references showing valves for pneumatic tires. These valves are of virtually every description but by far the majority require a spring forcing the valve to the closed position and have valve pin bridges of considerable width supporting the valve pin. In commercial use, valves of the art are of relatively small diameter. These factors, the presence of the springs, substantial pin bridges and the small diameter, have underlined the deficiencies of prior devices for use in tires on heavy equipment. Flow rates during filling and discharge have been slow because of the destruction of these structures. Further, in connection with certain prior valves of the core housing type, fast deflation has been achieved by removal of the entire core housing. There has been a hazard in deflating such tires in that the core and/or core housing will literally be "shot" out of the valve stem, pressured by the tire air pressure where pressure is often in excess of 100 lbs. per square inch. Removal of such a core housing has also, of course, required special tools.

Herein the word "tire" is used for simplicity to include tires, bags, tanks and other gas and air containers with which the valve may be used.

SUMMARY OF THE INVENTION

The present invention provides a valve fitting for a pneumatic tire and the like which is especially adapted for so-called "super bore" use. The fitting encloses a valve element adapted to cooperate with a seat in the fitting, the element supported on pins axially of the fitting. The pins are supported on movable clips of sheet metal disposed longitudinally of the fitting so as to provide "vane"-type structure, minimizing resistance to flow of large quantities of air. The valve element is movable bodily with the clips inside the fitting and is moved to the open position by rushing of air in through the fitting into the tire or to the closed position by the air pressure in the tire when the air supply is disconnected. No spring is involved. Further, the invention involves radial openings disposed in the fitting between the valve and the tire and normally covered by the tire spud or stem which may be exposed by slightly unscrewing the fitting from the spud or stem without completely removing it. This permits the discharge of air from the tire out through the holes. Thus, because the fitting stays on the tire stem or spud, no safety hazard is involved, and because no core or core housing needs to be removed to discharge air, tools are not necessary.

Certain matter disclosed herein but not claimed is the invention of Daniel Lejeune and is disclaimed. This matter is claimed in the co-pending U.S. patent application Ser. No. 556,163, filed by said Lejeune Mar. 6, 1975, for "Valve for Giant Tires".

BRIEF DESCRIPTION OF THE DRAWINGS

Other features and objects of the invention will be apparent from the following specification, including the drawings, all of which show a non-limiting embodiment of the invention. In the drawings.

DESCRIPTION OF THE PREFERRED EMBODIMENT

Figure 1:
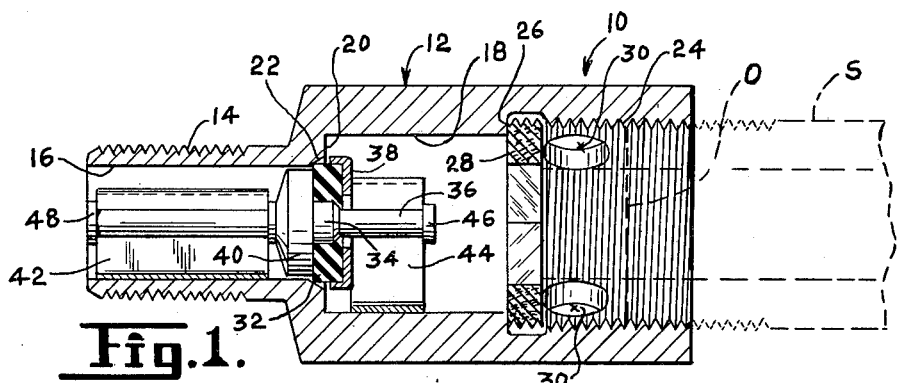
FIG. 1 shows a fitting embodying the invention in section with a tire spud or stem S shown in phantom connected thereto.

A fitting embodying the invention is shown in FIG. 1 and generally designated 10. It comprises a tubular body 12 having a reduced section 14. Inside the fitting is a smooth cylindrical surface 16 in the area of the reduced section, and a larger smooth cylindrical interior surface 18 thereadjacent.

Intermediate the surfaces 16, 18 there is provided an annular radial shoulder 20 which is chamfered off as at 22 to define a bevelled seat. On the opposite side of the surface 18 from the shoulder 20, the interior of the fitting is threaded as at 24 at a diameter slightly larger than the surface 18 to result in an annular shoulder 26.

Bearing against the shoulder 26 is an annular face washer 28 and disposed adjacent the face washer 28 are radial openings 30 through the fitting. Preferably, three or four of these holes are disposed uniformly about the periphery.

Cooperating with the seat 22 is the valve washer 32, preferably of sealing material such as Silastic. The sealing washer is mounted on an enlarged hub 34 of a pin 36 disposed on the axis of the fitting, the pin extending in either direction from the washer. A retaining cup 38 receives the washer 32 and is centrally apertured to receive the pin 36. The cup 38 is disposed against the opposite face of the washer 32 from seat 22. The opposite side of the washer is engaged by a second washer retainer 40. The remote surface of the retainer 40 is preferably frusto-conical to guide the valve into seating position as it closes.

The pin on opposite sides of the washer is supported by clip means, as shown. These clip means are, in the embodiment shown, formed of sheet material and comprise a first clip 42 engaging surface 16, and a second clip 44 engaging surface 18. As will be noted, the clips respectively engage portions of the pin and are held from lateral movement therealong by engagement with the second retainer 40 in the case of the clip 42, and the retaining cup 38 in the case of clip 44. The pin 36 is headed at its ends 46 and 48 respectively to further limit movement of the clips on the pin.

Figure 3:
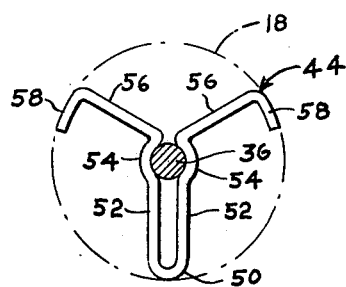
FIG. 3 is an enlarged end view taken on the line 3–3 of FIG. 2 and showing the configuration of a clip as used with the invention and showing the surface 18 in phantom.
Figure 4:
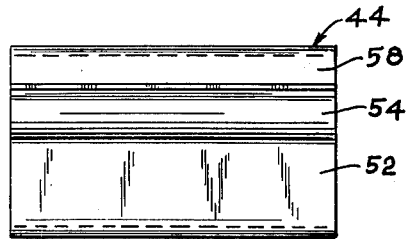
FIG. 4 is a side view of the clip of FIG. 3.

FIG. 3 is an end view of the clip 44. It should be understood, however, that the view may be taken as applying to the shape of the end view of clip 42, and the modified forms of clips shown in FIGS. 5 and 7 may be used interchangeably as one or the other or both of clips 42, 44, the end view shown in FIG. 3 being preferred. As fuller explanation, the end view of FIG. 3 may comprise the end shape of clip 44 or clip 42, or both, just as the end view of FIG. 5 or 7 may comprise the end view of clip 44 or clip 42, or both.

Referring more specifically to FIG. 3, the clip 44 comprises a bight 50 engaging therealong surface 18. The bight has inwardly extending legs 52 embracing the pin 36 in inwardly concave knees 54. On the other side of the pin 36, the legs respectively deflect outwardly in sections 56 and engage the surface 18 in doubled-back feet 58. As can be imagined, the legs 52–56 tend to flex somewhat at their bends so that the clip having such configuration can be readily stuffed into the tubular housing, the bight 50 and feet 58 engaging the surface 18, or the surface 16, to support the pin 36 on the axis of the housing.

Figure 5:
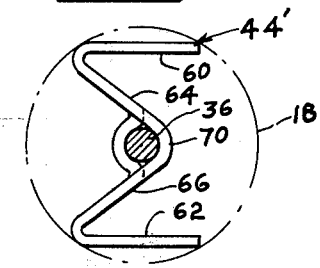
FIGS. 5 and 7 are modifications of the clip shown in FIG. 3.
Figure 6:
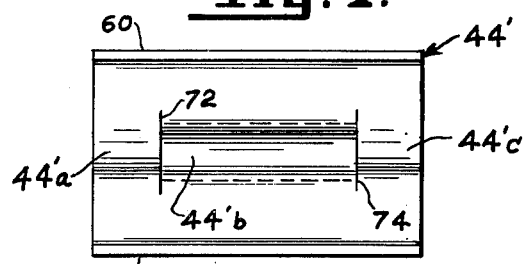
FIGS. 6 and 8 are side views of the clips shown in FIGS. 5 and 7 respectively.

The clip 44' structure shown in FIG. 5 has the shape of a capital Greek letter sigma. It is a single piece of sheet metal comprising upper and lower feet 60, 62 which each engage the surface 18 at spaced points. The material is doubled-back from the feet and legs 64, 66, as shown, to join in a central bend 70. As shown in FIG. 6, the clip is transversely slitted as at 72, 74 to define separate clip sections 44'a, 44'b, 44'c, which are alternately disposed on opposite sides of the pin 36" to tightly hug it, securing the clip in firm position thereon.

Figure 7:
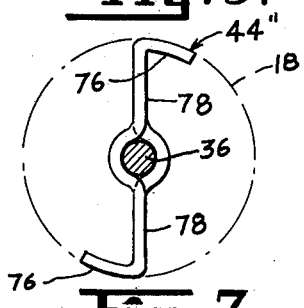
Figure 8:
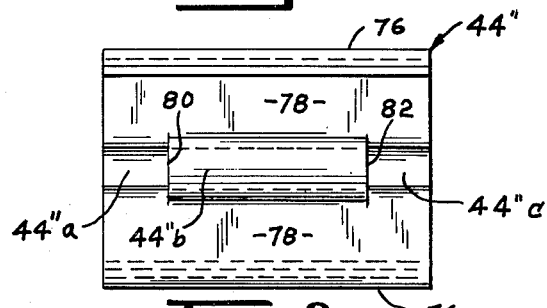

Referring now to FIG. 7, the clip 44" is of generally "S" shape and comprises a single sheet metal piece presenting a pair of oppositely directed diametrically opposed feet 76, engaging the surface 18. The sheet metal adjacent the feet is doubled-back in legs 78, preferably disposed on the same diameter of the housing. As with the FIG. 5, 6 embodiment, the clip 44" is transversely slit at spaced intervals at at 80 and 82 to define separate clip sections 44"a, 44"b, 44"c which are deflected to alternate sides of the pin 36 and tightly hug it. As with the other embodiments, the FIG. 7, 8 embodiment can be slightly distorted to slip into the housing and hold the pin 36 squarely in the center thereof, the feet 76 firmly disposed against the surface 18.

As discussed, with any of the embodiments of FIGS. 3 through 8, they are tightly held between the valve head parts 38, 40 by heads 46, 48 so that there is no relative movement thereof. At the same time, because the clips are held against the surfaces 16, 18 respectively only by the natural resilence of the sheet metal structure thereof, the valve assembly 31 may move bodily in an axial direction over these smooth surfaces 16, 18.

Figure 2:
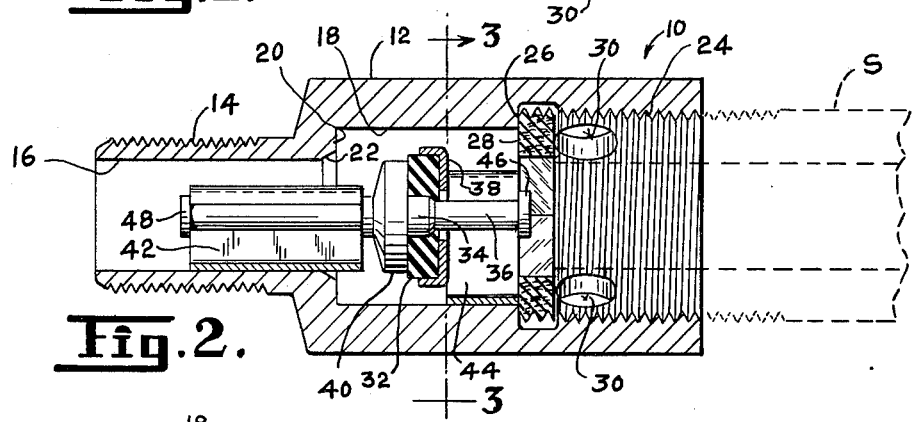
FIG. 2 is similar to FIG. 1 but shows the valve in the open condition.

The filling operation will thereby be apparent. The filling connection is attached to reduced section 14 either by a threaded connection or the conventional clamp and air is forced into the tire through the fitting in a rightward direction. This causes the valve assembly to shift bodily to the FIG. 2 position with clip 44 butting against washer 28, the washer 28 forming stop means for the assembly. The structure of the clips 44, 42 is such that they are disposed along the air flow line and offer minimum resistance thereto. Subsequently, when the air supply is taken away, air tending to rush out through the fitting in a leftward direction forces the valve closed by acting in a leftward direction against the retainer 38 and other parts. Thus, no spring is necessary to return the valve to the closed position.

For purposes of letting air out of the tire or other container to which the fitting is connected, it is merely necessary to unscrew the fitting partially from the valve spud or stem S backing the end of the stem off from the face washer 28 toward the broken line D in FIG. 1. This permits air to rush out of the now exposed ports 30 in a lateral direction with respect to the centerline of the fitting. Tightening the fitting 12 down on the spud S will cause a sealing connection to be made between the end of the spud and the face washer 28 so that the fitting is ready again for normal use.

It will be clear that the fitting described has many advantages among the foremost of which are the adaptability it has to fast flow input and discharge. This is achieved by the absence of a spring of any kind and the various structural features described.

Many variations of the invention are possible, all within the scope of the following claim language describing the invention:

We claim:
1. A valved fitting for pneumatic tires and the like comprising:
   a. a tubular housing having a reduced section, the inside of the housing having a smooth cylindrical surface of one diameter in the area of the reduced section, and a smooth cylindrical surface of a second larger diameter to one side of the reduced section, the inside presenting a seating shoulder intermediate the surfaces and coupling means on the opposite side of the second surface from the first surface;
   b. a valve comprising a pin disposed on the axis of the housing, the pin mounting intermediate its ends an annular sealing washer adapted to seat on the seating shoulder, and support means supporting the valve in the tubular housing, the support means comprising a pair of clips engaging the pin on either side of the washer respectively and engaging the first and second surfaces respectively, the clips each being of sheet material disposed longitudinally of the housing and having portions engaging the pin from opposite sides and also longitudinally engaging the associated surface of the housing at a plurality of points, the clips being held from longitudinal movement with respect to the pin, whereby the valve including clip means is movable bodily in the housing as the clips slide along their associated surfaces.

2. A valved fitting for pneumatic tires and the like as claimed in claim 1 wherein the pin is headed at either end and the clips are respectively held from longitudinal movement with respect to the pin at least partly by the adjacent pin heads.

3. A valved fitting for pneumatic tires and the like as claimed in claim 1 wherein the coupling means comprise threads inside the housing and a sealing face washer disposed intermediate the threads and the second surface.

4. A valved fitting for pneumatic tires and the like as claimed in claim 3 wherein the housing in the area of the threads is formed with radial openings adjacent the face washer.

5. A valved fitting for pneumatic tires and the like as clamed in claim 1 wherein stop means are provided in the fitting for limiting movement of the valve away from the seating shoulder.

6. A valved fitting for pneumatic tires and the like as claimed in claim 1 wherein at least one of the clips comprises a sheet metal body which in section radial of the housing presents a sigma-shaped figure, the top and bottom of the figure engaging the associated surface, the central vertex of the sigma being split transversely of the clip at spaced locations along the clip to define separate clip sections, at least one of the clip sections embracing the pin from one side and at least one from the other.

7. A valved fitting for pneumatic tires and the like as claimed in claim 1 wherein at least one of the clips comprises a sheet metal body which in section radial of the housing presents a generally S-shaped figure, the top and bottom of the figure engaging the associated surface on opposite sides of the pin, the central portion of the "S" being split transversely of the clip at spaced locations along the clip to define separate clip sections, at least one of the clip sections embracing the pin from one side and at least one from the other.

8. A springless tire valve comprising a housing presenting thereinside a seat intermediate the ends thereof, smooth cylindrical surfaces on either side of the seat, a valve body having an annular element cooperating with and on one side of the seat, the valve body having a pin extending axial of the housing on either side of the annular element, and a pair of clip elements made of sheet material mounted on the pin with all planes of the sheet material disposed longitudinally of the housing, the elements being disposed respectively on opposite sides of the annular element and extending outward from the pin to engage the surfaces respectively along a plurality of longitudinal portions of the surfaces on generally opposite sides of the pin, whereby the valve body and the clips can be slideably moved bodily longitudinally of the housing.

9. A springless tire valve as claimed in claim 8 wherein the housing is internally threaded on said side of the seat in a zone remote from the seat with respect to the smooth surface on said side, a radial annular shoulder facing the threads being disposed intermediate the threads and the adjacent smooth surface annular sealing means being disposed against the shoulder, the threaded area being formed with radial openings adjacent the sealing means.

10. A valved fitting for pneumatic tires and the like comprising:
  a. a tubular housing having a first longitudinal section, the inside of the housing having a smooth cylindrical surface of one diameter in the area of the first section, and a smooth cylindrical surface of a second larger diameter to one side of the first section, the inside presenting a seating shoulder intermediate the surfaces and coupling means on the opposite side of the second surface from the first surface;
  b. a valve comprising a pin disposed on the axis of the housing, the pin mounting intermediate its ends an annular sealing washer adapted to seat on the seating shoulder;
  c. support means supporting the valve in the tubular housing, the support means comprising a pair of clips engaging the pin on either side of the washer respectively, the clips each being of sheet material disposed longitudinally of the housing and having portions engaging the pin and also slideably engaging the respective surfaces of the housing, the clips being held from longitudinal movement with respect to the pin, whereby the valve including support means is movable bodily in the housing as the clips slide along their associated surfaces.

* * * * *